3,287,300
MONOCARBOXYLIC ACID ADDED TO VINYL ESTER POLYMER EMULSION TO LOWER THE COALESCENCE TEMPERATURE
Hendricus A. Oosterhof and Klaas Ruyter, Amsterdam, Netherlands, assignors to Shell Oil Company, New York, N.Y., a corporation of Delaware
No Drawing. Filed Mar. 9, 1964, Ser. No. 350,517
Claims priority, application Netherlands, Mar. 11, 1963, 290,023
5 Claims. (Cl. 260—23)

The invention relates to a process for the preparation of aqueous latices. More particularly, the invention relates to the preparation of paint latices having depressed film-forming temperatures.

Specifically, the invention provides a process for preparing stable polyvinyl ester emulsions which comprises adding from 0.1% to 20% of an aliphatic monocarboxylic acid having at least 9 carbon atoms in the molecule based on the weight of polymer to an aqueous emulsion of a polyvinyl ester.

It is well known that polymer films, particularly polyvinyl ester films, formed by evaporating a layer consisting of an aqueous emulsion of the polymers may have very different properties, depending on the circumstances obtained during evaporation. The temperature, in particular, plays a predominant role. If evaporation takes place below a specific temperature—the so-called minimum film-forming temperature (M.F.T.)—the resulting films, instead of being transparent and homogeneous, will be milky, cracked and swollen; at the same time adhesion will be poor and film-strength slight, so that the films are unserviceable for industrial purposes.

It is know that after addition of a few percent of formic acid, acetic acid, propionic acid or butyric acid, an aqueous polymer emulsion may be successfully dried at a temperature lower than the above-mentioned minimum film-forming temperature. However, said acids are less suitable as additives for polymer emulsions because of their unpleasant odor.

It is further known that the acids following the above-mentioned aliphatic monocarboxylic acids in the homologous series, viz, valeric acid and caproic acid, are completely unserviceable for such purpose. Addition of as little as 2% of these latter acids to polyvinyl ester emulsions caused coagulation.

Further research has now revealed that aliphatic monocarboxylic acids with nine or more carbon atoms in the molecule depress the minimum film-forming temperature without causing any coagulation of the polymer emulsions. Further, the very unpleasant odor of the lower carboxylic acids (particularly of butyric, valeric and caproic acids) is completely absent from these higher carboxylic acids.

It is therefore the primary object of the present invention to provide a process for the preparation of aqueous emulsions of polyvinyl esters which have depressed minimum film-forming temperatures with resulting improved properties such as strength, transparency and smoothness. Other objects will become apparent to one skilled in the art from the following discussion and disclosure.

These and other objects are accomplished by the process for the preparation of polymer compositions in the form of aqueous emulsions, which compositions are suitable for the application of surface coats and which compositions, apart from water, consist substantially of one or more polyvinyl ester polymers, said compositions containing one or more aliphatic monocarboxylic acids or mixtures thereof with at least nine carbon atoms.

The invention is generally applicable to all polymer emulsions employed in applying surface coatings to objects. Preferred, however, are polymer or copolymer emulsions based on one or more of the following: vinyl acetate; vinyl propionate; vinyl caprate; vinyl chloride; acrylic esters, such as methyl acrylate, ethyl acrylate, butyl acrylate, and 2-ethylhexyl acrylate; methacrylic esters such as methyl methacrylate, ethyl methacrylate and butyl methacrylate; maleic esters; styrene; butadiene and acrylonitrile. Forming an important group among these emulsions are those obtained by emulsion polymerization of vinyl esters of saturated aliphatic monocarboxylic acids. The minimum film-forming temperature of these polymer emulsions is, in many cases, 10–15° C., whereas application of the present invention may bring it down to around 5° C. or lower.

According to the invention good results are especially yielded by the use of polyvinyl ester emulsions prepared by emulsion polymerization of vinyl esters of saturated monocarboxylic acids, at least some of whose carboxyl groups are attached to tertiary and/or quaternary carbon atoms. The preparation of such polyvinyl ester latices or emulsions under certain favorable conditions forms the subject of the copending U.S. application Serial No. 251,767, filed January 16, 1963.

The amount of aliphatic monocarboxylic acid needed for the required effect may, in general, vary from 0.1 to 20%, based on the amount of solid polymer taken for processing. But higher or lower percentages may also be employed.

As there is a relationship between the amount of aliphatic monocarboxylic acid added and the minimum film-forming temperature, for optimum results these two quantities preferably should be determined by suitable tests. Their values may vary from case to case. Besides the nature of the aliphatic monocarboxylic acid, the nature and composition of the polymer emulsion employed play a role here. Between 2 and 10% of aliphatic monocarboxylic acid is often sufficient to bring down the minimum film-forming temperature of the polymer emulsion to between 0 and 5° C.

The aliphatic monocarboxylic acids employed in the process of the invention must have at least nine carbon atoms in the molecule. Although aliphatic monocarboxylic acids with a higher number of carbon atoms are not excluded, in general, no carboxylic acids having more than twenty-two carbon atoms in the molecule will in practice be employed for the present case.

The aliphatic monocarboxylic acids according to the invention may be saturated or unsaturated. They may be branched or unbranched, and at the same time substituents may occur in the molecule chains.

Examples of unsaturated aliphatic monocarboxylic acids with from nine to twenty-two carbon atoms are dehydrated castor oil fatty acids, oleic acid, linoleic acid and linolenic acid.

Two or more saturated and/or unsaturated aliphatic monocarboxylic acids may be employed together if required.

Excellent results are yielded by the use of saturated monocarboxylic acids in which the carboxyl groups are attached to tertiary and/or quaternary carbon atoms.

Suitable such alpha-branched saturated monocarboxylic acids may be represented by the general formula

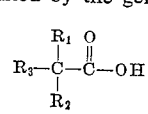

wherein $R_1$ and $R_2$ each represents the same or different alkyd radicals of normal, branched or cyclic structure and $R_3$ represents hydrogen or a hydrocarbyl radical. In the foregoing formula, $R_1$ and $R_2$ each may be a methyl, ethyl, propyl, butyl, pentyl, octyl, decyl, etc. radical. Hydrocarbyl radicals represented by $R_3$ comprise, for example, alkyl radicals of normal, branched or cyclic structure, including methyl, ethyl, propyl, butyl, pentyl, hexyl, octyl, as well as alkaryl, aralkyl and aryl radicals. Very suitable such monocarboxylic acids include the alpha,alpha-dialkyl monocarboxylic acids having from 9 to about 22 carbon atoms in the molecule. A preferred group comprises the acids possessing from about 9 to 19 carbon atoms with those acids having from 9 to 11 and 15–19 carbon atoms being especially preferred. A suitable method for their production is disclosed in U.S. 3,047,662, U.S. 3,059,005 and U.S. 3,059,006.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

For brevity the saturated aliphatic monocarboxylic acids in which the carboxyl groups are attached to tertiary and/or quaternary carbon atoms will be herein referred to as alpha-branched or branched monocarboxylic acids.

Although it is preferable to make use of the above-described mixtures of monocarboxylic acids branched at the alpha position which have, for example, nine to eleven or fifteen to nineteen carbon atoms to the molecule, other monocarboxylic acids branched at the alpha position—or mixtures thereof—are also very suitable.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages are by weight.

The monocarboxylic acids branched at the alpha positions employed in the examples are obtained by reacting olefins having eight to ten carbon atoms in the molecule with carbon monoxide and water in the presence of a catalyst consisting of phosphoric acid, boron trifluoride and water. They have nine to eleven carbon atoms to the molecule, and the carboxyl group is attached to a tertiary or quaternary carbon atom.

EXAMPLE I

Use was made of a polymer emulsion having a solids content of 50% prepared by polymerization of the following components:

| | Parts |
|---|---|
| Vinyl acetate | 51 |
| Vinyl esters of branched monocarboxylic acids ($C_9$–$C_{11}$) | 48 |
| Acrylic acid | 1 |

The solids content of the polymer emulsion was 50%; the minimum film-forming temperature was 12° C.

Alpha-branched saturated aliphatic monocarboxylic acids containing nine to eleven carbon atoms to the molecule (prepared as hereinbefore described and comprising a mixture of said acids having the carboxyl group attached to tertiary and/or quaternary carbon atoms) were added to the polymer emulsion in quantities of 2 or 5%, based on the amount of solid polymer.

After these acids had been added to the polymer emulsions and the mixture allowed to stand for twenty-four hours, the emulsions were cooled to 5° C., and with a 125μ doctor blade, applied to a sheet of glass cooled to 5° C. Film formation took place at 5° C. It was assessed after five hours.

Both the addition of 2 percent and of 5 percent of alpha-branched monocarboxylic acids with nine to eleven carbon atoms to the molecule yielded a film that was perfectly transparent, strong and smooth, and adhered exceptionally well to the substrate.

EXAMPLE II

The polymer emulsion used had the same composition as the one used in Example I.

Dehydrated castor oil fatty acids were added to the polymer emulsion in quantities of 2 or 5 percent, based on the amount of solid polymer.

In other respects the experiments were carried out in exactly the same way as described in Example I.

Both the addition of 2% and of 5% fatty acids yielded a film that was perfectly transparent, strong and smooth, and that adhered exceptionally well to the substrate.

Reference example

The polymer emulsion used had the same composition as the one used in Examples I and II.

The experiment was carried out in exactly the same way as described in Examples I and II, except that no aliphatic monocarboxylic acid was added.

Drying yielded a film of milky, swollen appearance, with a readiness to flake and with very little strength.

EXAMPLE III

Use was made of a commercial polymer emulsion with a polymer composed of:

| | Parts |
|---|---|
| Vinyl acetate | 85 |
| Vinyl caprate | 15 |

The solids content of the polymer emulsion was 56%; the minimum film-forming temperature was 10° C.

Alpha-branched saturated aliphatic monocarboxylic acids with nine to eleven carbon atoms to the molecule were added in the quantities given below, each based on the amount of solid polymer. This resulted in the minimum film-forming temperatures similarly recorded below:

A quantity of 2% resulted in an M.F.T. of 5° C.
A quantity of 4% resulted in an M.F.T. of 2° C.
A quantity of 6% resulted in an M.F.T. of −1° C.

EXAMPLE IV

Use was made of a commercial polymer emulsion incorporating a copolymer of vinyl acetate and 2-ethylhexyl acrylate. The amount of 2-ethylhexyl acrylate included herein was equivalent in plasticizing effect to 10% of dibutyl phthalate.

The solids content of the polymer emulsion was 55%; the minimum film-forming temperature was 9° C.

Branched monocarboxylic acids with nine to eleven carbon atoms to the molecule were added to the polymer emulsion in the quantities given below, each based on the amount of solid polymer. This resulted in the following minimum film-forming temperatures:

A quantity of 2% resulted in an M.F.T. of 5–6° C.
A quantity of 4% resulted in an M.F.T. of 2–3° C.
A quantity of 6% resulted in an M.F.T. of 0° C.

EXAMPLE V

The procedure of Example III is substantially repeated wherein the alpha-branched monocarboxylic acids were mixtures of said acids having 15–19 carbon atoms and were prepared from olefins containing 14–18 carbon atoms. Related depressed M.F.T.'s were obtained.

We claim as our invention:

1. A process for preparing polyvinyl ester emulsions having depressed film-forming temperatures which comprises adding from 0.1% to 20% of an aliphatic monocarboxylic acid having from 9 to 22 carbon atoms in the molecule based on the weight of polymer to an aqueous emulsion of a polymer of a vinyl ester.

2. A process as in claim 1 wherein the aliphatic monocarboxylic acid is employed in amounts from 2 to 10% by weight.

3. A process as in claim 1 wherein the aliphatic monocarboxylic acid is an alpha-branched saturated aliphatic monocarboxylic acid containing from 9 to 11 carbon atoms in the molecule.

4. A process as in claim 1 wherein the aliphatic monocarboxylic acid is an alpha-branched saturated aliphatic monocarboxylic acid containing from 15–19 carbon atoms in the molecule.

5. A process as in claim 1 wherein the polymer is a copolymer of vinyl acetate and vinyl esters of alpha-branched saturated aliphatic monocarboxylic acids containing from 9 to 11 carbon atoms.

References Cited by the Examiner

UNITED STATES PATENTS

| | | | |
|---|---|---|---|
| 2,567,678 | 9/1951 | Morrison | 260—27 |
| 2,914,495 | 11/1959 | Gordon et al. | 260—17.4 |
| 3,186,974 | 6/1965 | Verberg | 260—85.7 |

LEON J. BERCOVITZ, *Primary Examiner.*

R. A. WHITE, *Assistant Examiner.*